United States Patent
Shihab

(10) Patent No.: US 9,109,149 B1
(45) Date of Patent: *Aug. 18, 2015

(54) DROP IN REFRIGERANT BLEND FOR MINERAL OIL BASED SYSTEMS

(71) Applicant: Ahmad M. Shihab, Crozet, VA (US)

(72) Inventor: Ahmad M. Shihab, Crozet, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/171,302

(22) Filed: Feb. 3, 2014

Related U.S. Application Data

(63) Continuation of application No. 13/861,084, filed on Apr. 11, 2013, now Pat. No. 8,652,348, which is a continuation of application No. 13/718,722, filed on Dec. 18, 2012, now abandoned.

(51) Int. Cl.
*C09K 5/04* (2006.01)
*F25B 45/00* (2006.01)

(52) U.S. Cl.
CPC ..................... *C09K 5/045* (2013.01)

(58) Field of Classification Search
CPC .......... C09K 5/04; C09K 5/045; F25B 45/00; F25B 9/002
USPC .............................. 252/67; 62/292
See application file for complete search history.

(56) References Cited

U.S. PATENT DOCUMENTS

| | | | |
|---|---|---|---|
| 5,145,606 A | 9/1992 | Omure et al. | |
| 5,277,834 A * | 1/1994 | Bivens et al. | 252/67 |
| 5,417,871 A * | 5/1995 | Minor et al. | 252/67 |
| 5,705,086 A | 1/1998 | Ardito et al. | |
| 5,954,995 A * | 9/1999 | Goble | 252/67 |
| 6,207,071 B1 | 3/2001 | Takigawa et al. | |
| 6,374,629 B1 | 4/2002 | Oberle et al. | |
| 6,524,495 B1 * | 2/2003 | Lee et al. | 252/67 |
| 6,531,441 B1 * | 3/2003 | Minor et al. | 510/408 |
| 6,606,868 B1 | 8/2003 | Powell et al. | |
| 6,692,653 B2 | 2/2004 | Lee et al. | |
| 6,776,922 B2 | 8/2004 | Lee et al. | |
| 6,841,087 B2 | 1/2005 | Lee et al. | |
| 6,958,126 B2 * | 10/2005 | Goble | 252/67 |
| 7,380,405 B2 | 6/2008 | Harrison | |
| 7,507,348 B2 | 3/2009 | Kajiki et al. | |
| 7,560,045 B2 | 7/2009 | Brown et al. | |
| 7,704,404 B2 | 4/2010 | Spatz | |
| 8,652,348 B1 * | 2/2014 | Shihab | 252/67 |
| 2003/0001132 A1 * | 1/2003 | Lee et al. | 252/67 |
| 2003/0197149 A1 * | 10/2003 | Lee et al. | 252/67 |
| 2004/0016902 A1 * | 1/2004 | Lee et al. | 252/67 |
| 2004/0016903 A1 * | 1/2004 | Lee et al. | 252/67 |
| 2004/0069970 A1 * | 4/2004 | Goble | 252/67 |
| 2005/0156133 A1 * | 7/2005 | Goble | 252/67 |
| 2007/0284078 A1 * | 12/2007 | Leck et al. | 165/58 |
| 2007/0290163 A1 * | 12/2007 | Poole et al. | 252/67 |
| 2009/0095014 A1 * | 4/2009 | Sun et al. | 62/502 |

FOREIGN PATENT DOCUMENTS

WO    WO 2005083028 A1 *    9/2005    ............... C09K 5/04

OTHER PUBLICATIONS

"Standards for Flammable Refrigerants", Dec. 1997, 3 pages, International Institute of Refrigeration, Paris, France, 1997.
"White Paper: Revisiting Flammable Refrigerants", 2011, 19 pages, Underwriters Laboratories, Inc., United States of America, 2011.
Dupont, Suva, "Temperature glide in Dupont Suva MP, DuPont Suva HP, and DuPont Suva 407C Series Regerants Blends", 2004, 6 pages, E.I. du Pont de Nemours and Company.
Taras, M., "Evaluation of Mechanical Dehumidification Concepts (Part 1)", International Refrigeration & Air Conditioning Conference at Purdue, Jul. 17-20, 2006, 8 pages, Carrier Corporation, Syracuse, New York, 2006.

* cited by examiner

*Primary Examiner* — Douglas McGinty
(74) *Attorney, Agent, or Firm* — Morris, Manning & Martin, LLP; Daniel E. Sineway, Esq.; Bryan D. Stewart, Esq.

(57) ABSTRACT

The present disclosure relates to refrigerants generally, and more specifically to non-flammable, non-ozone depleting mixtures of refrigerants that may be substituted for (HCFC R-22, R-407C, R-417A, R-502, R-402A, R-402B, R-404A, R-408A &R-507A) and usable in mineral oil systems. Among the most preferred embodiments of the present invention(s) are mixtures that are substitutes for these refrigerants, comprising about 35 to 65 weight percent R-125, and about 20 to 55 weight percent R-134a, and about 5 to 25 weight percent of R-143a and about 1 to 5 weight percent hydro component of (R-600 OR R-601) or combination, and about 2-10 weight percent of R-227ea the weight percentages of the components being weight percentages of the overall mixture.

19 Claims, 4 Drawing Sheets

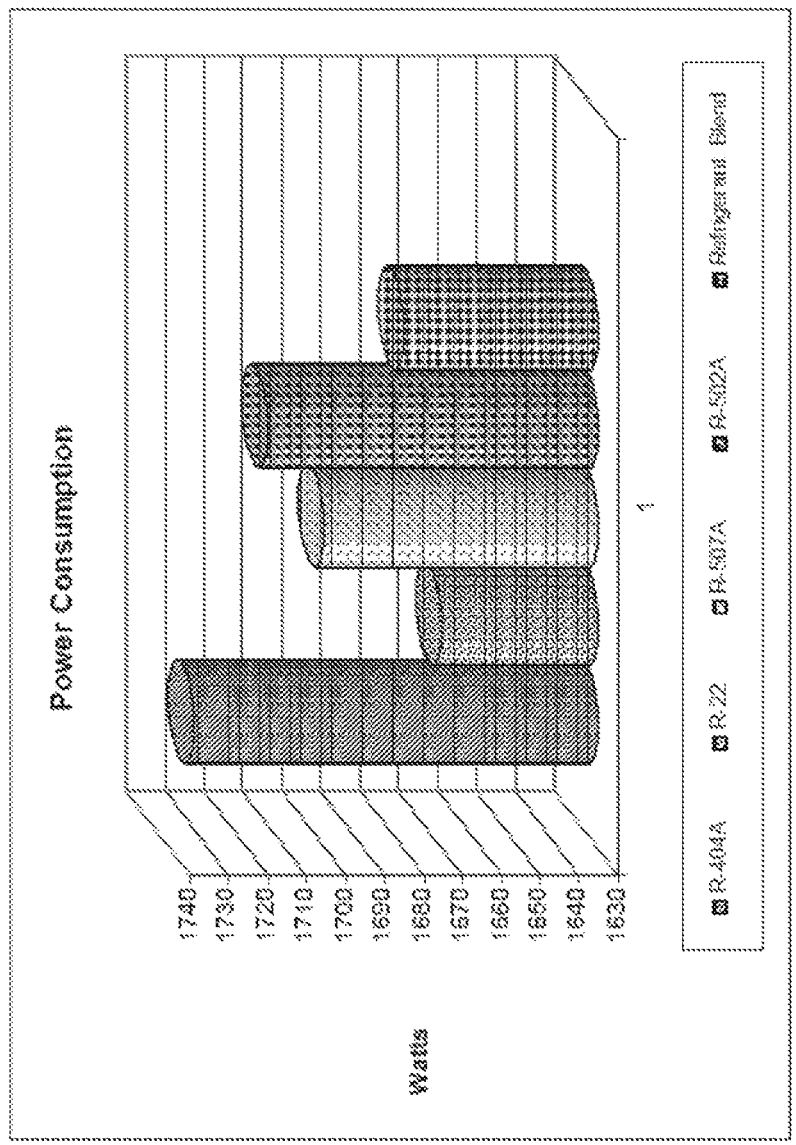
FIG. 1 Refrigerants Power Consumption

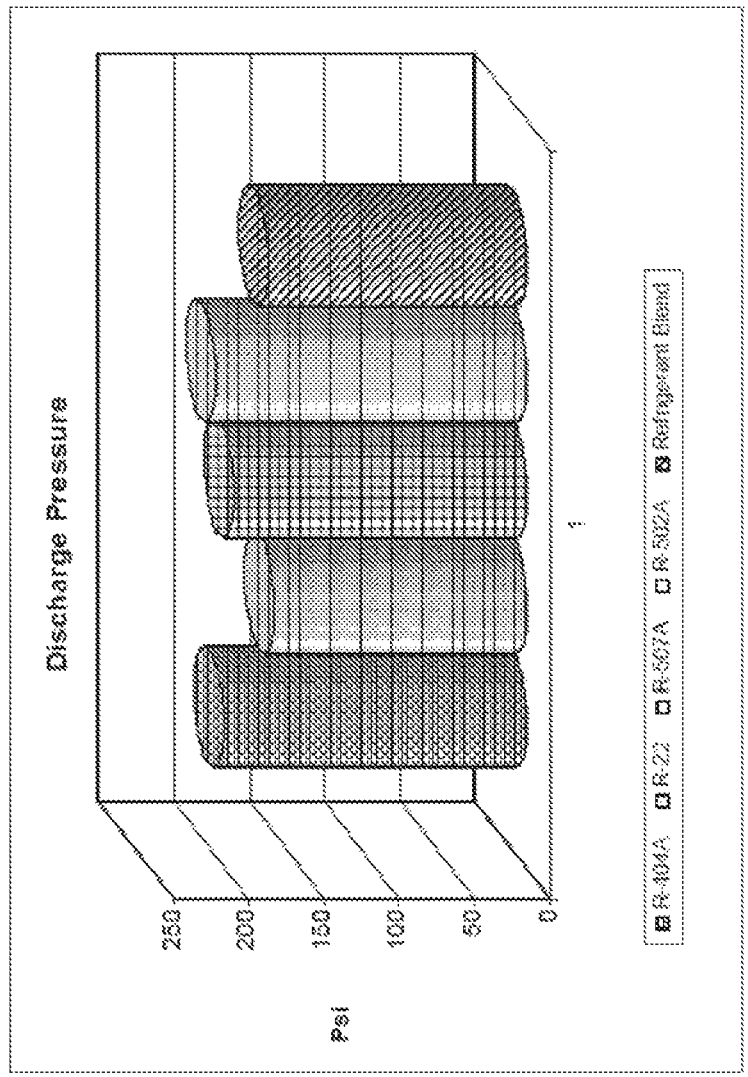
FIG. 2 Refrigerants Average Discharge Pressures

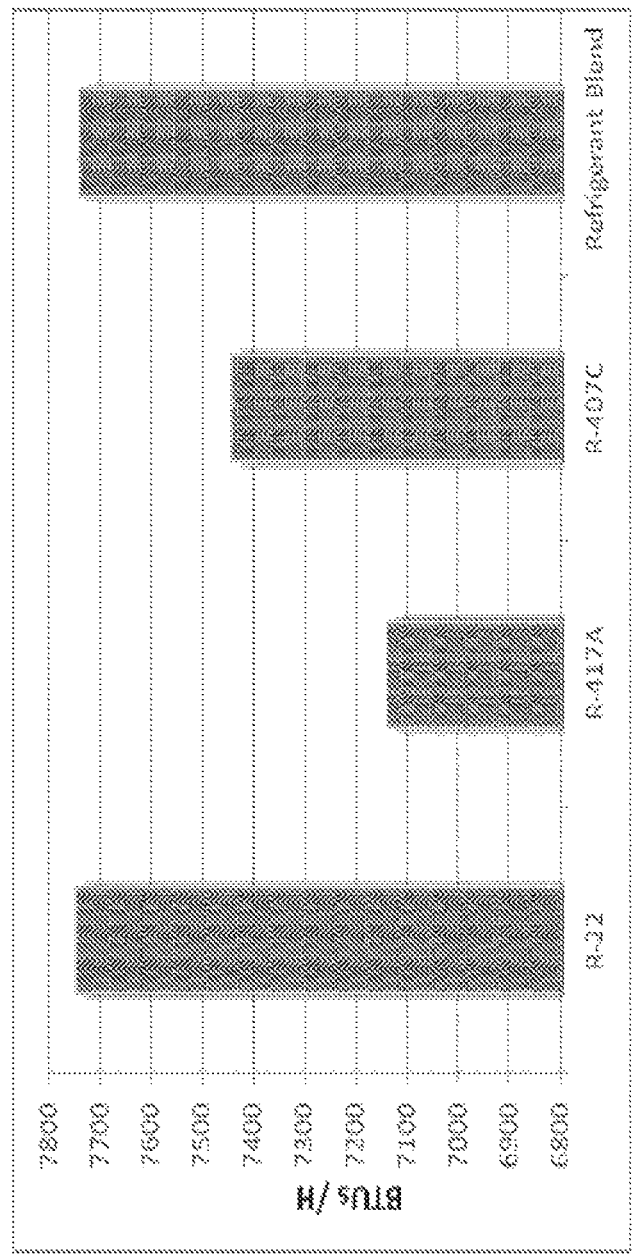
FIG. 3 Refrigerants Capacities

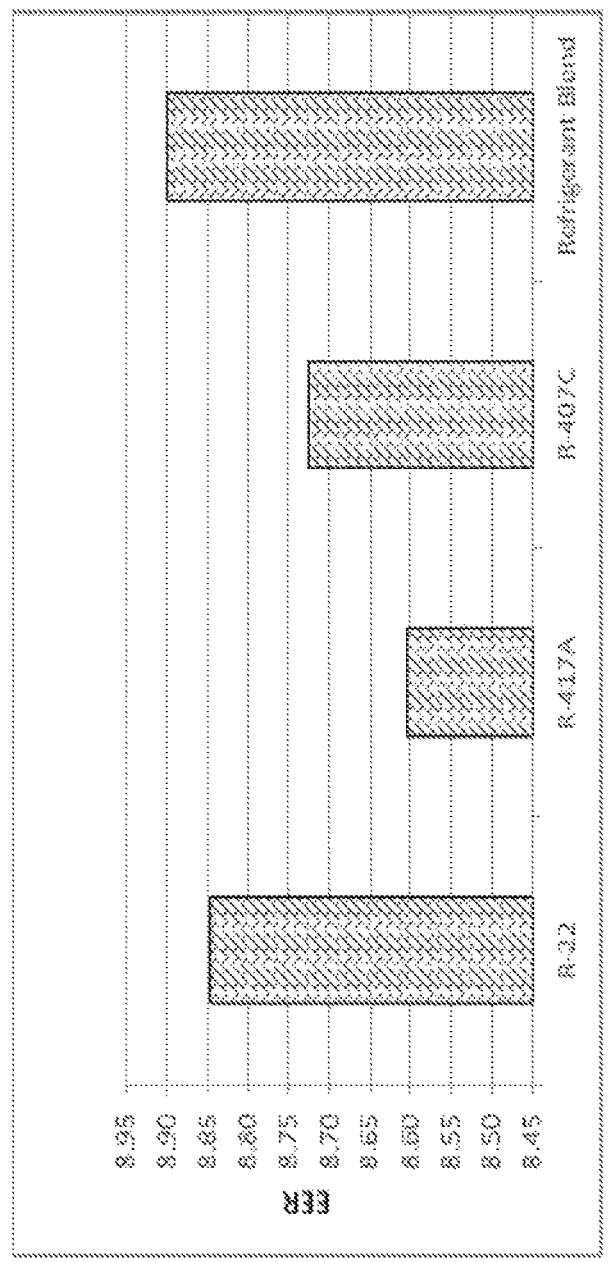
FIG. 4 Refrigerants Efficiencies

DROP IN REFRIGERANT BLEND FOR MINERAL OIL BASED SYSTEMS

CROSS REFERENCE TO RELATED APPLICATIONS

This Application is a continuation application and claims the benefit of and priority under 35 U.S.C. 120 to U.S. patent application Ser. No. 13/861,084 filed Apr. 11, 2013, entitled "Drop In Refrigerant Blend For Mineral Oil Based Systems," by Ahmad M. Shihab, pending, to be issued as U.S. Pat. No. 8,652,348, which is hereby incorporated by reference herein as if set forth herein in its entirety, which is a continuation of U.S. patent application Ser. No. 13/718,722, filed Dec. 18, 2012, entitled "Drop In Refrigerant Blend For Mineral Oil Based Systems," by Ahmad M. Shihab, which is hereby incorporated by reference herein as if set forth herein in its entirety.

TECHNICAL FIELD

The present disclosure relates to refrigerant blends, and more particularly to nonflammable, nonozone depleting, mixtures of refrigerants that may be substituted for HCFC-22, R-407C, R-417A, R-402A, R-402B, R-404A, R-408A, R-502, and R-507A which is usable in mineral oil systems.

BACKGROUND

The U.S. Environmental Protection Agency and other world scientific bodies have determined that refrigerants comprising chlorofluorocarbons (CFCs) cause harm to the Earth's stratospheric ozone layer after being released into the atmosphere. Hydrochlorofluorocarbons (HCFCs), which are chlorofluorocarbons containing one or more hydrogen atoms, also cause damage to the ozone layer but such damage is generally less than that caused by CFCs. Various rules, regulations, protocols and treaties in the world have phased out CFCs, or are now doing so. HCFCs are being allowed as "transition" substances between CFCs and various zero ozone depletion alternatives. HCFCs are also under phase outs, but on a much longer time scale than the CFCs, with the final HCFC phase-out being in the year 2030. Certain countries may phase out HCFCs earlier than 2030, and certain categories of use (e.g., production of new equipment containing HCFCs) may be phased out earlier, as well, while other categories of use (service fluids for repair of existing equipment) may be maintained until 2030.

Several non-ozone depleting refrigerants have already been developed in the prior art. However, most of them have one or more drawbacks. The main drawback is that refrigerants comprised of hydrofluorocarbons (HFCs), or mixtures thereof, do not mix (are not miscible in) mineral oils used for the earlier CFC and HCFC refrigerants (e.g., CFC-12 and HCFC-22, R-502, R-500). R-407C, comprising R-32/125/134a (23/25/52), closely matches the pressure temperature curve of HCFC-22. However, it requires ester (POE) oil and is totally non-miscible in mineral oil. Ester oils are far more expensive and are less stable than mineral oils. Ester oils also are far more hygroscopic than mineral oils, so moisture can enter a refrigeration system much easier during manufacture or service than it can with mineral oils. This moisture is extremely damaging, and causes the refrigerants to slowly hydrolyze and decompose into hydrofluoric acid (HF) and other components leading to early system failures.

This disclosure relates generally to novel refrigerant blends that can be used to replace chlorofluorocarbon (CFC) and hydrochlorofluorocarbon (HCFC) refrigerants. More particularly, the disclosure relates to novel refrigerant blends that can be used to replace R-22 (chlorodifluoromethane) in refrigeration systems designed to use R-22 as the refrigerating fluid.

Refrigeration systems have been in widespread use for decades and have a wide variety of uses, such as comfort cooling, household refrigeration, automobile air conditioning, commercial freezer cooling. Such systems work on the basic premise that a fluid, known as a refrigerant, picks up heat from an area to be refrigerated, and disposes of the heat in an area not adversely affected by an increase in heat. Typically, refrigeration processes encompass a changing state of the refrigerant fluid from a liquid to a vapor, and from a vapor to a liquid, which change of state allows for the rapid removal of heat from the area to be refrigerated. Different types of refrigeration systems use different refrigerants having properties designed to enable the given system to approach peak performance.

Chlorofluorocarbon refrigerants such as R-12 (dichlorodifluoromethane) were the refrigerants of choice for many years in domestic and commercial refrigeration, as well as in automobile air conditioners. However, in view of the recognition in the scientific community that these chlorine-containing refrigerants have an adverse effect on the earth's ozone layer, international agreements have mandated a phase-out of these refrigerants in favor of more environmentally friendly refrigerants. Hydrochlorofluorocarbon refrigerants such as R-22, while believed to be less environmentally problematic than CFCs, are also chlorine-containing, and have likewise raised concerns in the scientific community. International agreements have called for a gradual phase-out of HCFC refrigerants.

Numerous low ozone-depleting refrigerants have been promoted as replacement refrigerants. A widely used replacement refrigerant has been R-134a (1,1,1,2tetrafluoroethane). R-134a contains no chlorine atoms, and is non-ozone-depleting, nonflammable and non-toxic. However, the use of R-134a necessitates major changes in most refrigeration systems. For example, the mineral oil lubricants typically used with CFC and HCFC refrigerants are not compatible with R-134a. As a result, it is necessary to completely drain this oil from systems previously using CFC and HCFC refrigerants, and replaces it with other lubricants that are more compatible with R-134a, such as polyolester (POE) and polyalkylene glycol (PAG) lubricants. In addition, some equipment used in existing air conditioning systems is not compatible with R-134a, thus necessitating significant overhaul and replacement of portions of these air conditioning systems When new products are designed and/or put into service, such products can be engineered for use with new refrigerants such as R-134a. Thus, such products can be manufactured with components that are compatible with R-134a, and can be produced for use with compatible lubricating oils. However, the situation is more problematic when existing refrigeration systems require replacement refrigerant. Replacements are often required when, for example, existing refrigerant is leaked or evaporated from the system. Replacement refrigerant also must be periodically added to such systems during routine maintenance of the system. In existing refrigeration systems, it is often cost prohibitive to retrofit the system to be compatible with non-CFC or non-HCFC refrigerants such as R-134a. In addition, in small systems it is often inconvenient and uneconomical to completely drain the existing lubricant and replace it with lubricating oil that is more compatible with a replacement refrigerant.

Several refrigerant compositions that are intended to replace R-22 are commercially available. The three best known replacement refrigerants are R-407C (a combination of R-134a, R-125, and R-32), R-410A (a binary blend of R-125 and R-32) and R-417A (a blend of R-125, R-134a, and R-600). R-410A is a high pressure refrigerant that cannot be used in existing R-22 equipment. As a result, the existing refrigeration equipment must be replaced when this refrigerant is used. R-407C can be used in existing R-22 systems; however, this refrigerant is not compatible with the mineral oil lubricants used in such systems. As a result, the system must be flushed, and the lubricant must be replaced with one that is compatible. R-417 A can be used in existing R-22 systems with existing oils. However, this refrigerant shows a decrease in refrigerating capacity about 5 to 15 percent when compared to R-22.

Thus, there is a long-felt but unresolved need for replacing a R-22 refrigerant with a new refrigerant, without the necessity of draining the existing lubricant and/or overhauling the existing refrigeration equipment to make it compatible with the new refrigerant. Preferably, the replacement refrigerant would be low cost, have low flammability and toxicity, have refrigerating capacity similar to the existing refrigerant, be compatible with the existing system and lubricant, and have the ability to substantially resist fractionation into flammable components upon evaporation or leakage from the refrigeration system.

BRIEF SUMMARY OF THE DISCLOSURE

Briefly described, and according to one embodiment, aspects of the present disclosure generally relate to novel refrigerant compositions that may be used in place of CFC and HCFC refrigerants. The inventive refrigerant compositions are a non-stratospheric ozone depleting alternative that can be used to replace R-22 refrigerants.

In particular, the inventive refrigerant composition meets at least the following objectives:
1. To provide a solution for replacing R-22 refrigerant with a non-stratospheric ozone depleting alternative.
2. To provide a solution for replacing R-502 refrigerant with a non-stratospheric ozone depleting alternative.
3. To provide a solution for replacing R-404A refrigerant with an alternative that uses lower cost and more stable mineral oil.
4. To provide a solution for replacing R-407C refrigerant with an alternative that uses lower cost and more stable mineral oil.
5. To provide a solution for replacing R-417A refrigerant with an alternative that uses mineral oil in a wider variety of applications and provides much less loss of capacity than R-417A.
6. To be compatible with lubricants and materials used in CFC and HCFC systems (mineral and alkylbenzene oil).
7. To improve energy efficiency compared to R-22.
8. To reduce the compressor discharge temperatures compared to R-22. This will allow higher compression ratios (lower suction pressures and thus lower temperatures) than R-22. R-22 has a very high heat of compression, which limits the maximum compression ratios due to the need to keep compressor discharge gas temperatures below about 300° F. to prevent breakdown of the refrigerant and oil.
9. To be nonflammable, and to be able to pass a UL2182 flammability test to qualify for an ASHRAE designation of A1.

The preferred embodiments of the present disclosure are mixtures of refrigerants that are substitutes for chlorodifluoromethane (R-22) refrigerant, comprising about 35 to 65 weight percent R-125, and about 20 to 55 weight percent R-134a, and about 5 to 25 weight percent of R-143a and about 1 to 5 weight percent of (R-600 OR R-601 or combination) and about 2-10 weight percent of R-227ea. The weight percentages of the components being weight percentages of the overall mixture.

Other preferred mixture of refrigerants that is a substitute for R-502 (48.8 weight percent chlorodifluoromethane and 51.2 weight percent chloropentafluoroethane) and R-404A (44 weight percent pentafluoroethane, 52 weight percent 1,1,1-trifluoroethane, and 4 weight percent 1,1,1,2-tetrafluoroethane), R-402A, R-402B, R-404A, R-408A and R-507A refrigerants, comprising about 45 to 75 weight percent Pentafluoroethane (HFC-125); and about 5 to 20 weight percent 1,1,1,2-Tetrafluoroethane (HFC-134a); and about 10 to 40 weight percent 1,1,1, Trifluoroethane (HFC-143a);) and about 1 to 5 weight N-Butane(R-600) or Isopentane (R-601a) or combination and about 2 to 10 weight percent 1,1,1,2,3,3,3-Heptafluoropropane (HFC-227ea) with the weight percentages of the components of the mixture being weight percentages of the overall mixture.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 1 is a graphical chart showing exemplary power consumption (in units of Watts) of various refrigerants.

FIG. 2 is a graphical chart showing average discharge pressures (in units of psi) of various refrigerants.

FIG. 3 is a graphical chart showing exemplary capacities (in units of BTUs/H) of various refrigerants.

FIG. 4 is a graphical chart showing exemplary efficiencies of various refrigerants.

DETAILED DESCRIPTION OF THE DISCLOSED EMBODIMENTS

For the purposes of promoting an understanding of the principles of the invention, reference will now be made to the embodiments described below and specific language will be used to describe the same. It will nevertheless be understood that no limitation of the scope of the invention(s) is thereby intended, such alterations and further modifications in the described embodiments, and such further applications of the principles of the invention(s) as described therein being contemplated as would normally occur to one skilled in the art to which the present disclosure relates.

The present disclosure teaches novel refrigerant blends comprising the refrigerants Pentafluoroethane (HFC-125); 1,1,1,2-Tetrafluoroethane (HFC-134a); 1,1,1, Trifluoroethane (HFC-143a); 1,1,1,2,3,3,3-Heptafluoropropane (HFC-227ea); and {N-Butane(R-600) or Isopentane(R-601a) or both combination}. The refrigerant blends may be used in place of CFC and HCFC refrigerants, and particularly, may be used in place of refrigerant R-22. The inventive refrigerant blends are substantially non-toxic, non-ozone-depleting, compatible with refrigeration compressor lubricating oils presently in use, and have refrigerating properties that are substantially the same as, or better than, the properties of the refrigerant that it is replacing. In addition, the inventive refrigerant compositions are non-flammable; both as originally placed in the refrigeration system, and after 99% of the refrigerant have leaked from the system. The inventive refrigerant blends utilize a unique combination of non-ozone depleting refrigerants. Components utilized in the inventive blend include R-125, R-134a, R-143a, R-227ea and hydrocarbon component (Either R-600 or R-601a or both combination). In what follows next, two particularly preferred embodiments of the inventive refrigerant blend are described below. The components are identified, along with the proportions, by weight percent of the components in the overall refrigerant blend.

Blend 1: A Mixture of Refrigerants that is a Substitute for R-22, R-134a, R-417a and R-507C.

R-125 in an amount of about 35-65%; preferably 40-60%; more preferably 50-57%, and most preferably 55%;

R-134a in an amount of about 20-55%; preferably 25-45%; more preferably 27-35%, and most preferably 32%;

R-143a in an amount of about 5-25%; preferably 5-20%; more preferably 6-10%, and most preferably 7%;

R-600 Or R-601a or combination of both hydrocarbons components in the amount of about 1-5%; preferably 2-4%; more preferably 2-3%, and most preferably 3%;

R-227ea in an amount of about 2-10%; preferably 2-8%; more preferably 2-5%, and most preferably 3%;

Blend 2: A mixture of refrigerants that is a substitute for R-404A, R-502, R-22 R-402A, R-402B, R-404A, R-408A, and R-507A.

R-125 in an amount of about 45-75%; preferably 50-70%; more preferably 55-68%, and most preferably 65%;

R-134a in an amount of about 5-20%; preferably 5-15%; more preferably 6-10%, and most preferably 7%;

R-143a in an amount of about 10-40%; preferably 15-30%; more preferably 20-28%, and most preferably 22%;

R-600 Or R-601a or combination of both hydrocarbons components amount of about 1-5%; preferably 2-4%; more preferably 2-3%, and most preferably 3%;

R-227ea in an amount of about 2-10%; preferably 2-8%; more preferably 2-5%, and most preferably 3%;

The proportions of each of the listed ingredients may be varied within the general ranges provided, as long as the variations are not so substantial that the benefits of the invention(s) cannot be achieved. The amounts of the components should not be varied in a manner such that the operating characteristics of the refrigeration system and/or the flammability, toxicity and ODP (ozone depleting potential) are adversely affected to any significant degree. Processes for mixing refrigerant components to arrive at a refrigerant blend are well known in the refrigerant art, and no special techniques are required to prepare the inventive blends. It has been known that a small amount of a hydrocarbon component in a refrigerant blend can greatly increase the miscibility of compressor lubrication oils commonly found in refrigeration systems, such as R-22 systems. In some systems as little as 1% of a hydrocarbon component provides sufficient miscibility to enable satisfactory oil return to the compressor. When the concentration of the hydrocarbon component of the present refrigerant blend exceeds about 2.5% by weight of the total blend, the refrigerant has miscibility similar to that of R-22 in mineral-based compressor lubricating oil.

The Hydrocarbon components N-butane have a boiling point (about 31° F., −0.6° C.) and Isopentane have a boiling point (about 82° F., 27.8° C.) is higher than the evaporator temperature of most R-22 refrigerating systems such as air conditioning systems, where the evaporator temperature is normally between about 25 and 30° F. (between −4 and 1.1° C.). As refrigerant leaks out of the system or container, the percentage of N-butane and/or Isopentane in the liquid phase goes down the refrigerant remaining in each phase after leak out never exceeds the flammability limit.

To take advantage of the effects exhibited by certain hydrocarbons, a combination of components N-butane and Isopentane or combination of both are selected such that the percentage of the hydrocarbon component in the refrigerant blend does not appreciably change as refrigerant leaks out of the system, and therefore does not cause the hydrocarbon component of either the vapor or liquid phase to exceed the flammability limit.

EXAMPLES

Example 1

Performance Testing

The time required to reduce the air temperature inside an insulated freezer at a defined starting temperature provides a good estimate of the refrigerating capacity of a refrigerant blend, and also provides a good basis to compare the performance of the blend to the performance of R-22 and other commercially available blends that are compatible with a refrigeration system.

A refrigerant blend according to the present invention(s) was prepared with the following percentages (based on the weight of the entire blend) of components:

1. R-125a in an amount of 65 wt. %.
2. R-134a in an amount of 7 wt. %.
3. R-143a in an amount of 22 wt. %
4. R-600 in an amount of 1.5 wt. % AND R-601a in amount of 1.5 wt. %.
5. R-227ea in an amount of 3 wt. %.

A freezer made by True manufacturing (R-404A) system, 72 cubic foot reach in has a 5550 BTU/h capacity was charged with the above blend. The refrigeration system was connected to a scanner to record the temperature inside the box and measure the discharge pressure of the compressor and the power consumptions.

The refrigerant blend described above was charged in the testing unit and the system was continuously run to reduce the temperature in the cooling box from 60° F. {15.6° C. (Room Temperature)} to the lowest possible temperature. The same procedure was followed for comparative refrigerant blends R-404A, R-502A, R-22a and R-507A.

The test results are provided below:

TABLE 1

| (Temperature drop for R-404a) | |
|---|---|
| Time (Min) | Temp.° F. |
| 0 | 60.39 |
| 10 | 34.04 |
| 20 | 15.28 |
| 30 | 1.61 |
| 40 | −6.4 |
| 50 | −11.38 |
| 60 | −14.51 |
| 70 | −16.85 |
| 80 | −18.42 |
| 90 | −19.68 |
| 100 | −20.56 |
| 110 | −21.25 |
| 120 | −21.93 |

TABLE 1-continued (Temperature drop for R-404a)

| Time (Min) | Temp.° F. |
|---|---|
| 130 | −22.32 |
| 140 | −23.01 |

TABLE 2

(Temperature drop for R-502a)

| Time (Min) | Temp.° F. |
|---|---|
| 0 | 60.71 |
| 10 | 40.58 |
| 20 | 23.29 |
| 30 | 10.3 |
| 40 | 0.44 |
| 50 | −6.69 |
| 60 | −11.58 |
| 70 | −14.9 |
| 80 | −17.15 |
| 90 | −18.81 |
| 100 | −19.98 |
| 110 | −20.86 |
| 120 | −21.44 |
| 130 | −21.93 |
| 140 | −22.22 |
| 150 | −22.42 |
| 160 | −23.01 |

TABLE 3

(Temperature drop for R-22a)

| Time (Min) | Temp.° F. |
|---|---|
| 0 | 60.46 |
| 10 | 34.23 |
| 20 | 17.73 |
| 30 | 4.64 |
| 40 | −5.13 |
| 50 | −11.48 |
| 60 | −15.68 |
| 70 | −18.71 |
| 80 | −20.56 |
| 90 | −21.93 |
| 100 | −23.1 |

TABLE 4

(Temperature drop for R-507a)

| Time (Min) | Temp.° F. |
|---|---|
| 0 | 60.76 |
| 10 | 37.46 |
| 20 | 19.09 |
| 30 | 5.13 |
| 40 | −4.64 |
| 50 | −10.8 |
| 60 | −14.61 |
| 70 | −17.44 |
| 80 | −19.39 |
| 90 | −20.76 |
| 100 | −21.83 |
| 110 | −22.62 |
| 120 | −23.3 |

TABLE 5

(Temperature drop for Refrigerant Blend.

| Time (Min) | Temp.° F. |
|---|---|
| 0 | 60.54 |
| 10 | 35.02 |
| 20 | 19.09 |
| 30 | 6.79 |
| 40 | −2.2 |
| 50 | −8.94 |
| 60 | −13.14 |
| 70 | −16.07 |
| 80 | −18.12 |
| 90 | −19.88 |
| 100 | −22.15 |
| 110 | −23 |

From the above data (Tables 1-5) indicates it took 110 minutes to drop the temperature inside the box from 60° F. to −23° F. when the invented blend utilized; this is faster than tested comparable refrigerant blends like R-404a, R-502A, R-507 and very close to R-22 temperature drop.

That concludes the inventive blend has better cooling capacity than any other tested blends R-404a, R-502A and R-507.

Also the power consumption was measured during running the mentioned system for each refrigerant and the results are listed on Table 6 and FIG. 1:

TABLE 6

(power consumptions)

| Refrigerant | Watts |
|---|---|
| R-404A | 1734.05 |
| R-22 | 1670.42 |
| R-507A | 1700.65 |
| R-502A | 1714.93 |
| Refrigerant Blend | 1679.96 |

Refrigerant blend consumed 179.96 watts which is lower than what other refrigerant consumed, this indicates that the refrigerant blend has better efficiency compared to other tested blends like R-404a, R-502A and R-507. Further more the compressor discharges pressures were measured after running 420 minutes and the results are listed on Table 7, see FIG. 2.

TABLE 7

(Average Discharge Pressures)

| Refrigerant | Average Discharge Pressure (psi) |
|---|---|
| R-404A | 202.14 |
| R-22 | 168.25 |
| R-507A | 195.5 |
| R-502A | 207.3 |
| Refrigerant Blend | 171.64 |

The above test results indicate that the average discharge pressure for the invented blend during the test period was 171.64 psi which is lower compared to other test blends like R-404a, R-502A and R-507. This property is very essential to long lasting compressor life.

Example 2

Further performance testing was performed in insulated box utilizing a Samsung Split system air conditioner (Model 590ANX02) manufactured to use R-22 refrigerant. The evaporator placed inside the box (8'×10'×7') (2.44 m×3.05 m×2.13 m.) and was lined with a 4-inch (10.2 cm.) layer of polyurethane. The air conditioner was connected to a scanner to record the temperature inside the box, total current AMPs and current voltage at any given minute to calculate the total BTUs and the efficiency (EER).

Tests were performed on a blend according to Blend 1 as determined previously:
1. R-125a in an amount of 55 wt. %.
2. R-134a in an amount of 32 wt. %.
3. R-143a in an amount of 7 wt. %
4. R-600 in an amount of 1.5 wt. % AND R-601a in amount of 1.5 wt. %.
5. R-227ea in an amount of 3 wt. %

Based on the weight of the entire blend

Data were collected (Total BTUs and EER at any given minute) as the room temperature stabilized to 70° F. as the unit thermostat sat to.

Comparative tests were run on R-22 and R-417A and R-407C.

The ambient temperature was almost 82° F. (27.8° C.) during the tests of all blends. Data were illustrated on Table 8-Table 11:

TABLE 8

(R-22 Test data)

| Reading No. | Set point | Read | Total Watts | Total BTUs | AC Volts | AC Current | Watts | EER |
|---|---|---|---|---|---|---|---|---|
| 1 | 70 | 70.5 | 2273 | 7750 | 245.8 | 3.6 | 879 | 8.81 |
| 2 | 70 | 70.1 | 2267 | 7730 | 245.8 | 3.6 | 874 | 8.85 |
| 3 | 70 | 69.4 | 2263 | 7720 | 245.5 | 3.6 | 889 | 8.68 |
| 4 | 70 | 69.9 | 2263 | 7720 | 245.1 | 3.6 | 870 | 8.87 |
| 5 | 70 | 69.7 | 2288 | 7810 | 245 | 3.6 | 873 | 8.95 |
| 6 | 70 | 69.7 | 2268 | 7740 | 244.8 | 3.6 | 869 | 8.91 |
| Average | 70.00 | 69.88 | 2270.33 | 7745.00 | 245.33 | 3.60 | 875.67 | 8.85 |

TABLE 9

(R-417A Test data)

| Reading No. | Set point | Read | Total Watts | Total BTUs | AC Volts | AC Current | Watts | EER |
|---|---|---|---|---|---|---|---|---|
| 1 | 70 | 70.3 | 2025 | 6910 | 246.7 | 3.5 | 851 | 8.12 |
| 2 | 70 | 70.1 | 2041 | 6960 | 246.8 | 3.4 | 834 | 8.34 |
| 3 | 70 | 69.7 | 2094 | 7140 | 247.9 | 3.4 | 847 | 8.43 |
| 4 | 70 | 69.3 | 2045 | 6980 | 246.8 | 3.3 | 819 | 8.52 |
| 5 | 70 | 69.5 | 2131 | 7270 | 246.6 | 3.4 | 831 | 8.75 |
| 6 | 70 | 70.2 | 2112 | 7200 | 247.5 | 3.3 | 825 | 8.73 |
| 7 | 70 | 69.6 | 2033 | 6940 | 247 | 3.3 | 824 | 8.42 |
| 8 | 70 | 69.6 | 2066 | 7050 | 245.5 | 3.4 | 835 | 8.44 |
| 9 | 70 | 70 | 2291 | 7820 | 245.3 | 3.4 | 834 | 9.38 |
| 10 | 70 | 69.6 | 2294 | 7830 | 245.5 | 3.4 | 823 | 9.52 |
| 11 | 70 | 70.2 | 1998 | 6820 | 246.2 | 3.3 | 802 | 8.51 |
| 12 | 70 | 69.9 | 1979 | 6750 | 245.4 | 3.4 | 837 | 8.07 |
| Average | 70 | 69.83 | 2092.42 | 7139.17 | 246.43 | 3.38 | 830.17 | 8.60 |

TABLE 10

(R-407C Test data)

| Reading No. | Set point | Read | Total Watts | Total BTUs | AC Volts | AC Current | Watts | EER |
|---|---|---|---|---|---|---|---|---|
| 1 | 70 | 70.5 | 2011 | 6860 | 247.3 | 3.6 | 898 | 7.64 |
| 2 | 70 | 70.2 | 2035 | 6940 | 246.9 | 3.6 | 889 | 7.81 |
| 3 | 70 | 70 | 2041 | 6960 | 246.9 | 3.6 | 896 | 7.77 |
| 4 | 70 | 69.7 | 2049 | 6990 | 246.5 | 3.5 | 860 | 8.13 |
| 5 | 70 | 69.2 | 2056 | 7010 | 247 | 3.6 | 892 | 7.86 |
| 6 | 70 | 69.2 | 2353 | 8030 | 246.8 | 3.5 | 870 | 9.23 |
| 7 | 70 | 69.6 | 2381 | 8120 | 246.8 | 3.4 | 848 | 9.57 |
| 8 | 70 | 70 | 2357 | 8040 | 246.8 | 3.5 | 872 | 9.22 |
| 9 | 70 | 70.3 | 2317 | 7910 | 246.7 | 3.6 | 887 | 8.92 |
| 10 | 70 | 70.1 | 2324 | 7930 | 246.3 | 3.6 | 897 | 8.84 |
| 11 | 70 | 70 | 2293 | 7820 | 246.3 | 3.7 | 907 | 8.62 |
| 12 | 70 | 70.1 | 2279 | 7780 | 246.3 | 3.7 | 900 | 8.65 |
| Average | 70.0 | 69.80 | 2267.67 | 7736.67 | 246.61 | 3.57 | 881.44 | 8.78 |

TABLE 11

(Refrigerant Blend)

| Reading No. | Set point | Read | Total Watts | Total BTUs | AC Volts | AC Current | Watts | EER |
|---|---|---|---|---|---|---|---|---|
| 1 | 70 | 70.60 | 2515 | 8580 | 246.7 | 3.5 | 858 | 10 |
| 2 | 70 | 69.8 | 1968 | 6710 | 247.1 | 3.4 | 849 | 7.9 |
| 3 | 70 | 70.2 | 2155 | 7350 | 244.9 | 3.5 | 857 | 8.57 |
| 4 | 70 | 69.8 | 2279 | 7780 | 246.5 | 3.6 | 887 | 8.78 |
| 5 | 70 | 70 | 2262 | 7720 | 246.2 | 3.5 | 869 | 8.88 |
| 6 | 70 | 69.5 | 2396 | 8180 | 246.7 | 3.5 | 855 | 9.56 |
| 7 | 70 | 69.7 | 2415 | 8240 | 246.3 | 3.5 | 870 | 9.47 |
| 8 | 70 | 70.4 | 2241 | 7650 | 246.6 | 3.5 | 856 | 8.93 |
| 9 | 70 | 69.7 | 2197 | 7490 | 244.8 | 3.6 | 877 | 8.54 |
| 10 | 70 | 69.4 | 2270 | 7750 | 245.3 | 3.6 | 871 | 8.9 |
| 11 | 70 | 69.5 | 2302 | 7850 | 244.8 | 3.6 | 871 | 9.01 |
| 12 | 70 | 70.4 | 2285 | 7800 | 244.7 | 3.7 | 894 | 8.72 |
| 13 | 70 | 70.6 | 2294 | 7830 | 245.6 | 3.6 | 879 | 8.9 |
| 14 | 70 | 70.4 | 2322 | 7920 | 246 | 3.6 | 886 | 8.94 |
| 15 | 70 | 70.1 | 2334 | 7960 | 246.1 | 3.6 | 876 | 9.09 |
|  |  | 70.01 | 2282.33 | 7787.33 | 245.89 | 3.55 | 870.33 | 8.95 |
| Average | 70 | 70.1 | 2282.33 | 7787.33 | 245.88 | 3.55 | 870.33 | 8.90 |

As demonstrated by the above data and FIG. 3, it clearly when the unit has charged with the refrigerant blend it had capacity comparable with R-22 and better capacity compared to R-417A and R-407C. Also the a/c unit has less power consumption compared to all tested blends which means has better efficiency (Total EER) FIG. 4.

It is to be understood that the above-described blends are merely illustrative embodiments of the principles of the present disclosure, and that other compositions and methods for using same in refrigeration and air conditioning systems may be devised by those skilled in the art, without departing from the spirit and scope of the invention(s) disclosed herein. It is therefore intended that the foregoing detailed description be regarded as illustrative rather than limiting.

Example 3

R-125a/R-134a/R-143a/R-600/R-601/R-227A
(65/7/22/1.5/1.5/3)

Ten (10) pounds refrigerant blend per the present invention was prepared with the following percentages of components:
1. R-125a in an amount of 65 wt. %.
2. R-134a in an amount of 7 wt. %.
3. R-143a in an amount of 22 wt. %
4. R-600 in an amount of 1.5 wt. % AND R-601a in amount of 1.5 wt. %.
5. R-227ea in an amount of 3 wt. %

All based on the weight of the entire blend.

The blend charged into small charging cylinder which had been evacuated to 100 microns of vacuum. The initial vacuum was sufficient to draw in the hydro component (R-600 and R-601a) then R-227a. The charging cylinder was next placed in freezer for 2 hours to lower the cylinder temperature the charging process continued in the sequence of R-134a, R-143a and finally R-125a.

After the components were added, the cylinder was shaken and rolled by hand to mix the components. The cylinder pressure was 135 PSIG at about 72° F. was noted.

The charging cylinder was allowed to set overnight to make sure it was stabilized. A quarter pound sample of the blend charged into small stainless steel cylinder has a needle capillary tube allows discharging the refrigerant blend in vapor state (normally used in chromatograph testing machines).

A quick fractionation and flammability test was done by slowly vapor leaking out the charging sample through a needle valve (over a 20 minute period). A propane torch flame was moved about the area of the leaking vapor to see if it could sustain ignition when the torch flame was removed. This test is not designed to replace the UL2182 or ASTM E681 tests, but only to provide a quick check to whether the mixture is introducing any ignite and if so there would be no point in doing the UL2182 test.

This sample didn't sustain ignition at the very beginning of the leak down nor toward the end where the last drop of the refrigerant leaked out.

This is a good indication that this blend isn't flammable.

Example 4

A computer simulation with REFPROP V 6.0 indicates that the mixture of Example 2 has bubble/dew pressures close to R-22 which would be good alternative refrigerant to be used in comfort cooling systems specially the discharge pressures are close in matching R-22 which will not cause damages to the compressor after long usage, also it has better mineral oil return compared to R-417A and other R-22 alternatives and that is due to the small amount of the hydro component (only 3%).

Unlike R-417A, which has about 22 percent reduced capacity compared to R-22.

Blend of example 2 would be close in matching R-22 in capacity and efficiency.

Example 5

R-125a/R-134a/R-143a/R-600/R-601/R-227A
(65/7/22/1.5/1.5/3)

1. R-125a in an amount of 65 wt. %.
2. R-134a in an amount of 7 wt. %.
3. R-143a in an amount of 22 wt. %
4. R-600 in an amount of 1.5 wt. % AND R-601a in amount of 1.5 wt. %.
5. R-227ea in an amount of 3 wt. %

Based on the weight of the entire blend.

A computer simulation with RERPROP V6.0 indicates that the mixture of Example 1 would be a close match to replace R-22, R-404A, and R-502, see Table 11.

TABLE 12

| (Refrigerant pressures Vs. Temperatures) | | | | |
|---|---|---|---|---|
|  | 0° F. | 32° F. | 70° F. | 130° F. |
| Blended sample psi | 21.00 | 42.10 | 86.60 | 214.02 |
| R-22 | 21.16 | 42.45 | 85.75 | 214.75 |
| R-404A | 22.60 | 45.04 | 90.62 | 224.90 |
| R-502 | 27.22 | 50.60 | 98.22 | 227.75 |

Although the pressures may be slightly higher than R-404A, it should still work in most cases and provide some increase in capacity. This is especially useful in display refrigerators and freezers were it may be less expensive to use example 1 blend refrigerant compared to any other system using POE oil.

What is claimed is:

1. A refrigerant mixture, comprising:
    Pentafluoroethane (HFC-125) comprising between about 35 to 65 weight percent;
    1,1,1,2-Tetrafluoroethane (HFC-134a) comprising between about 20 to 55 weight percent;
    1,1,1-Trifluoroethane (HFC-143a) comprising between about 5 to 25 weight percent;
    one or more hydrocarbon components comprising about 1 to 5 weight percent; and
    1,1,2,3,3,3-Heptafluoropropane (HFC-227ea) comprising between about 2 to 10 weight percent.

2. The refrigerant mixture of claim 1, wherein each weight percent represents its respective weight percentage of the refrigerant mixture.

3. The refrigerant mixture of claim 1, wherein the refrigerant mixture comprises a substitute for chlorodifluoromethane in refrigerant applications.

4. The refrigerant mixture of claim 1, wherein:
    the Pentafluoroethane (HFC-125) comprises about 65 weight percent;
    the 1,1,1,2-Tetrafluoroethane (HFC-134a) comprises about 7 weight percent;
    the 1,1,1-Trifluoroethane (HFC-143a) comprises about 22 weight percent;
    the one or more hydrocarbon components comprises about 3 weight percent; and
    the 1,1,1,2,3,3,3-Heptafluoropropane (HFC-227ea) comprises about 3 weight percent.

5. The refrigerant mixture of claim 1, wherein the one or more hydrocarbon components are selected from the group comprising: R-600, R-601, and R-601a.

6. A refrigerant mixture, comprising:
    Pentafluoroethane (HFC-125) comprising between about 45 to 75 weight percent;
    1,1,1,2-Tetrafluoroethane (HFC-134a) comprising between about 5 to 20 weight percent;
    1,1,1, Trifluoroethane (HFC-143a) comprising between about 10 to 40 weight percent;
    1,1,1,2,3,3,3-Heptafluoropropane (HFC-227ea) comprising between about 2 to 10 weight percent; and
    at least one hydrocarbon component comprising between about 1 to 5 weight percent.

7. The refrigerant mixture of claim 6, wherein each weight percent represents its respective weight percentage of the refrigerant mixture.

8. The refrigerant mixture of claim 6, wherein the refrigerant mixture comprises a substitute for one or more of the following refrigerant blends: R-502, R-404A, R-402A, R-402B, R-404A, R-408A, R-407C, R-502 and R-507A.

9. The refrigerant mixture of claim 8, wherein the R502 comprises chlorodifluoromethane comprising about 48.8 weight percent and chloropentafluoroethane comprising about 51.2 weight percent.

10. The refrigerant mixture of claim 8, wherein the R404A comprises pentafluoroethane comprising about 44 weight percent, 1,1,1-trifluoroethane comprising about 52 weight percent, and 1,1,1,2-tetrafluoroethane comprising about 4 weight percent.

11. The refrigerant mixture of claim 6, wherein:
    the Pentafluoroethane (HFC-125) comprises about 65 weight percent;
    the 1,1,1,2-Tetrafluoroethane (HFC-134a) comprises about 7 weight percent;
    the 1,1,1-Trifluoroethane (HFC-143a) comprises about 22 weight percent;
    the 1,1,1,2,3,3,3-Heptafluoropropane (HFC-227ea) comprises about 3 weight percent; and
    the at least one hydrocarbon component comprises about 3 weight percent.

12. The refrigerant mixture of claim 6, wherein the at least one hydrocarbon component is selected from the group comprising: R-600, R-601, R-601a.

13. A method for producing refrigeration in a refrigeration system designed for chlorodifluoromethane refrigerant, comprising the steps of:

obtaining a predetermined amount of chlorodifluoromethane refrigerant;
substituting for the predetermined amount of chlorodifluoromethane refrigerant a mixture comprising the following components:
   Pentafluoroethane (HFC-125) comprising between about 35 to 65 weight percent of the mixture;
   1,1,1,2-Tetrafluoroethane (HFC-134a) comprising between about 20 to 55 weight percent of the mixture;
   1,1,1, Trifluoroethane (HFC-143a) comprising between about 5 to 7 weight percent of the mixture;
   1,1,1,2,3,3,3-Heptafluoropropane (HFC-227ea) comprising between about 1 to 5 weight percent of the mixture; and
   at least one hydrocarbon component comprising between about 1 to 5 weight percent of the mixture.

14. The method of claim 13, wherein:
the Pentafluoroethane (HFC-125) comprises about 55 weight percent;
the 1,1,1,2-Tetrafluoroethane (HFC-134a) comprises about 32 weight percent;
the 1,1,1, Trifluoroethane (HFC-143a) comprises about 7 weight percent;
the 1,1,1,2,3,3,3-Heptafluoropropane (HFC-227ea) comprises about 3 weight percent; and
the at least one hydrocarbon component comprises about 3 weight percent.

15. A method for using a substitute refrigerant blend in a refrigeration system, comprising the steps of:
obtaining a predetermined amount of one of the following refrigerants: R-502, R-404A, R-402A, R-402B, R-404A, R-408A, R-407C, R-502 and R-507A,
substituting for the predetermined amount of refrigerant a mixture comprising the following components:
   Pentafluoroethane (HFC-125) comprising between about 45 to 75 weight percent of the mixture;
   1,1,1,2-Tetrafluoroethane (HFC-134a) comprising between about 5 to 20 weight percent of the mixture;
   1,1,1, Trifluoroethane (HFC-143a) comprising between about 10 to 40 weight percent of the mixture;
   1,1,1,2,3,3,3-Heptafluoropropane (HFC-227ea) comprising between about 2 to 10 weight percent of the mixture; and
   at least one hydrocarbon component comprising between about 1 to 5 weight percent of the mixture.

16. The method of claim 15, wherein the R502 comprises chlorodifluoromethane comprising about 48.8 weight percent and chloropentafluoroethane comprising about 51.2 weight percent.

17. The method of claim 15, wherein the R404A comprises pentafluoroethane comprising about 44 weight percent, 1,1,1-trifluoroethane comprising about 52 weight percent, and 1,1,1,2-tetrafluoroethane comprising about 4 weight percent.

18. The method of claim 15 wherein:
the Pentafluoroethane (HFC-125) comprises about 65 weight percent;
the 1,1,1,2-Tetrafluoroethane (HFC-134a) comprises about 7 weight percent;
the 1,1,1-Trifluoroethane (HFC-143a) comprises about 22 weight percent;
the 1,1,1,2,3,3,3-Heptafluoropropane (HFC-227ea) comprises about 3 weight percent; and
the at least one hydrocarbon component comprises about 3 weight percent.

19. The method of claim 15, wherein the at least one hydrocarbon component is selected from the group comprising: R-600, R-601, and R-601a.

* * * * *